Patented Sept. 30, 1952

2,612,459

UNITED STATES PATENT OFFICE 2,612,459

SOLDERING FLUX

Hobart H. Willard, Ann Arbor, Mich., and William S. Gale, Syracuse, N. Y., assignors to McCord Corporation, Detroit, Mich., a corporation of Maine No Drawing. Application June 20, 1950,
Serial No. 169,291

15 Claims. (Cl. 148—23)

This invention relates to soldering fluxes and has particular reference to flux compositions that are especially suitable for soft soldering operations although the utility of the flux compositions is not limited to use in connection with soft soldering.

One of the prerequisites of good soldering is the formation of a true alloy between the metals being joined and the solder, and there is some evidence that this alloying action produces crystals of an intermetallic compound at the interface. The presence of an oxide coating and other foreign material on the surface of the metals to be joined seriously inhibits or entirely prevents this alloying action from taking place. It has been the practice to employ a fluxing agent to remove these interfering films from the surface of the metals to be joined and the solder itself. Presumably during the soldering operation the flux makes it possible for the molten solder to flow over chemically cleaned surfaces; however, in order for the solder to form an alloy with the solid metals it is necessary that the adhesion tension between the molten solder and the solid metals be greater than the cohesive forces within the molten solder itself and also be of a higher order than the adhesive forces causing the flux to wet the metals.

The above considerations show that the following are desirable characteristics of a soldering flux:

1. The flux should be in a substantially fluid condition at temperatures below the solidus temperature of the solder and should be in a substantially fluid condition throughout the plastic range and until the molten solder has ceased to flow.

2. The flux should be capable of removing oxides of metals and other interfering films and coatings from the metals to be joined by reacting with such oxides, films and coatings either to dissolve, reduce or deterge the same.

3. It should prevent the re-oxidation of the metal surfaces during soldering.

4. It should be capable of being displaced from the solid metal by the solder and should serve to reduce the surface tension of the molten solder.

5. It should leave no residues within or surrounding the soldered joint which will promote corrosion of the joint or surrounding metals.

6. Its use should introduce a minimum of health hazards.

Fluxing agents are often dissolved in water which functions merely as a carrier or vehicle for the flux and is evaporated before the solder reaches its liquidus temperature, leaving the flux, which is generally a salt or salt mixture, on the metal. When this salt or mixture begins to melt and/or decompose it reacts with the oxides or other interfering films and coatings on the material to be soldered to dissolve and/or reduce and/or deterge such films or coatings. Reference herein to the melting point or range or decomposition point or range of soldering fluxes refers to that of substantially anhydrous material. Other vehicles, such as alcohol, rosin, waxes, petrolatum and other materials, are often used.

Although some cleaning may be undertaken by the flux as applied, the real work of removing the oxides, films and other coatings from the metal surfaces begins when the flux fuses, and this cleaning action should be largely completed immediately prior to the melting of the solder. The lowest liquidus temperature of most of the commonly used tin-lead solders is above 180° centigrade, and it is therefore desirable that the flux should begin to melt and/or decompose below 180° centigrade.

Zinc chloride either in a solid form or in aqueous solution is in general use as a soldering flux. It satisfies several of the requirements outlined above, but it has the disadvantage of depositing fused residues which remain within or surrounding the joint, and these residues cause severe corrosion unless they are removed. The nature of these fused residues is such that it is very difficult or impossible to remove them satisfactorily, and in many instances their corrosive action cannot be tolerated. Fumes from zinc chloride fluxes have a very corrosive action on jigs, fixtures and other plant equipment. Furthermore, both the raw zinc chloride flux and its fumes are particularly dangerous to operating personnel.

A further objection to the use of zinc chloride is that the salt does not fuse at a temperature below the melting point of the eutectic tin-lead solder, which is approximately 180° centigrade. As most of the commonly used tin-lead solders either are melted or their melting range starts at about 180° centigrade, it is desirable that a flux which is to be used efficiently with the vast majority of these solders should be in a substantially fluid condition at temperatures below 180° centigrade. Since it is in this liquid or semi-liquid condition that the flux has the ability to clean the solder and the surfaces to be soldered, it should maintain this ability until the solder ceases to flow. In order to satisfy this requirement some agent is generally added to zinc chloride to form a composition with a lower melting point. One of the agents most commonly used for this purpose is ammonium chloride which in itself is not a good fluxing agent since it does not melt but merely sublimes.

So-called non-corrosive fluxes have been proposed to avoid some of the disadvantages encountered in the use of a zinc chloride type flux, and these generally contain a salt, particularly a hydrohalogen salt, of an organic base, and are used either by themselves or in connection with a rosin type soldering flux. The fluxing action of these so-called non-corrosive fluxes is generally very poor in contrast to zinc chloride, and they can be shown to be corrosive under certain conditions. In many cases overheating these fluxes causes them to sinter and they leave behind a gummy, carbonaceous mass which is nearly impossible to remove and which interferes with further soldering to a considerable extent. The only flux heretofore which could be said to be nearly non-corrosive is rosin, but rosin does not fulfill one of the most important properties of a good flux: namely, that it should have a solvent or slagging action on the oxides of metals and other coatings. Additionally, the hard, lacquer-like residues left by rosin prohibit its use in many applications.

It has also been heretofore proposed to use salts of hydrazine and salts of derivatives of hydrazine as fluxes in soldering operations. The present invention provides improved compositions suitable for use as fluxes which contain salts of hydrazine and derivatives thereof as one ingredient. The new fluxes, in comparision with those already known, possess improved properties from the standpoint of cleaning, spreading, and wetting. Additionally, they are less corrosive, and they sputter less in use.

We have found that these advantages can be obtained by admixing with the salt of hydrazine or salt of a derivative thereof or a mixture of such salts one or more salts of hydroxylamine, cyclohexylamine, morpholine, piperidine, ethylenediamine, ammonia, or a primary, secondary or tertiary amine. We have also found that certain tetra-alkyl ammonium halides and lower aliphatic carboxylic acid amides can be used to improve the properties of the salts of hydrazine or salts of hydrazine derivatives when used as fluxes.

The following examples illustrate the preparation of various compositions which fall within the broad scope of this invention, but are not to be considered limitative thereof.

A dry mixture composed of 40% by weight of hydrazine monohydrochloride and 60% by weight of ammonium chloride was dissolved in water to form a solution containing 2% by weight of the salts. More concentrated flux compositions were also prepared by dissolving the dry mixture in water to form solutions containing salt concentrations of 10% and 20% by weight.

A dry mixture composed of 95% by weight of hydrazine dihydrochloride and 5% by weight of ammonium chloride was dissolved in water to form a solution containing 5% by weight of the salts. A more concentrated flux resulted when the dry mixture was dissolved in water to form a solution containing 20% by weight of the salts.

A dry mixture composed of 98% by weight of hydrazine monohydrobromide and 2% by weight of ammonium chloride was dissolved in water to form a solution containing 2% by weight of the salts. More concentrated fluxes were also prepared by dissolving the dry mixture in water to form solutions containing 10% and 20% by weight of the salts. These procedures were also repeated, but using dry mixtures containing 80, 60, 50, 40 and 20% by weight of hydrazine monohydrobromide, the remainder in each case being ammonium chloride.

A dry mixture composed of 80% by weight of hydrazine dihydrobromide and 20% by weight of ammonium chloride was dissolved in water to form a solution containing 5% by weight of the salts. A flux containing a higher concentration was also prepared containing 15% by weight of the salts.

A dry mixture composed of 80% by weight of hydrazine bisdihydro-phosphate

$$(H_2N\text{---}NH_2.2H_3PO_4)$$

and 20% by weight of ammonium chloride was dissolved in water to form a solution containing 10% by weight of the salts. A similar but more concentrated flux was also prepared containing 20% by weight of the salts.

A dry mixture composed of 80% by weight of semicarbazide hydrochloride and 20% by weight of ammonium chloride was dissolved in water to form a solution containing 2% by weight of the salts. More concentrated fluxes were also prepared by dissolving 5 and 10% by weight of the salts in water. These procedures were repeated using a dry mixture which contained 40% by weight of semicarbazide hydrochloride and 60% by weight of ammonium chloride.

A dry mixture composed of 80% by weight of semicarbazide hydrobromide and 20% by weight of ammonium chloride was dissolved in water to form a solution containing 2% by weight of the salts. More concentrated fluxes were also prepared by dissolving 5 and 10% by weight of the salts in water. These procedures were repeated using a dry mixture which contained 40% by weight of semicarbazide hydrobromide and 60% by weight of ammonium chloride.

A dry mixture composed of 40% by weight of hydrazine monohydrochloride and 60% by weight of ammonium bromide was dissolved in water to form a solution containing 2% by weight of the salts. More concentrated flux compositions were prepared by dissolving the dry mixture in water to form solutions containing salt concentrations of 10% and 20% by weight.

A dry mixture composed of 95% by weight of hydrazine dihydrochloride and 5% by weight of ammonium bromide was dissolved in water to form a solution containing 5% by weight of the salts. A more concentrated flux resulted when the dry mixture was dissolved in water to form a solution containing 20% by weight of the salts.

A dry mixture composed of 98% by weight of hydrazine monohydrobromide and 2% by weight of ammonium bromide was dissolved in water to form a solution containing 2% by weight of the salts. More concentrated fluxes were prepared by dissolving the dry mixture in water to form solutions containing 10% and 20% by weight of the salts. These procedures were also repeated, but using dry mixtures containing 80, 60, 50, 40 and 20% by weight of hydrazine monohydrobromide, the remainder in each case being ammonium bromide.

A dry mixture composed of 40% by weight of hydrazine monohydrochloride, 30% by weight of ammonium chloride and 30% by weight of ammonium bromide was dissolved in water to form a solution containing 2% by weight of the salts. Additional fluxes were also prepared containing 10 and 20% by weight of the dry mixture.

A dry mixture was prepared containing 80% by weight of hydrazine monohydrochloride and 20% by weight of monoethylamine hydrochloride. Portions of this mixture were dissolved in water to form 5, 10 and 20% by weight solutions, and these procedures were also repeated using a dry mixture containing 50% by weight of hydrazine monohydrochloride and 50% by weight of monoethylamine hydrochloride.

A dry mixture was prepared containing 80% by weight of hydrazine monohydrobromide and 20% by weight of mono-ethylamine hydrochloride. Portions of this mixture were dissolved in water to form 5, 10 and 20% by weight solutions, and these procedures were also repeated using a dry mixture containing 50% by weight of hydrazine monohydrobromide and 50% by weight of monoethylamine hydrochloride.

A dry mixture was prepared containing 80% by weight of hydrazine monohydrobromide and 20% by weight of diethylamine hydrochloride. Portions of this mixture were dissolved in water to form 5, 10 and 20% by weight solutions, and these procedures were also repeated using a dry mixture containing 50% by weight of hydrazine monohydrobromide and 50% by weight of diethylamine hydrochloride.

A dry mixture was prepared containing 80% by weight of hydrazine monohydrobromide and 20% by weight of triethylamine hydrochloride. Portions of this mixture were dissolved in water to form 5, 10 and 20% by weight solutions, and these procedures were also repeated using a dry mixture containing 50% by weight of hydrazine monohydrobromide and 50% by weight of triethylamine hydrochloride.

A dry mixture was prepared containing 25% by weight of hydrazine monohydrobromide, 25% by weight of hydrazine monohydrochloride, and 50% by weight of ammonium chloride. Portions of this dry mixture were dissolved in water to form 10 and 20% by weight solutions.

A dry mixture was prepared containing 25% by weight of semicarbazide hydrobromide, 25% by weight of hydrazine monohydrochloride, and 50% by weight of ammonium chloride. Portions of this dry mixture were dissolved in water to form 10 and 20% by weight solutions.

A dry mixture was prepared composed of 95% by weight of hydrazine dihydrobromide, 2.5% by weight of hydrazine monohydrobromide, and 2.5% by weight of ammonium bromide. Portions of this dry mixture were dissolved in water to form 2, 10 and 20% by weight solutions. These procedures were also repeated using a dry mixture composed of 20% by weight of hydrazine dihydrobromide, 60% by weight of hydrazine monohydrobromide, and 20% by weight of ammonium bromide.

A dry mixture was prepared composed of 45% of hydrazine monohydrobromide, 5% of hydrazine dihydrobromide, 5% of ammonium bromide, and 45% of ammonium chloride by weight. Portions of this dry mixture were dissolved in water to form 10 and 20% by weight solutions.

A dry mixture was prepared containing 75% by weight of 1,1-dimethylhydrazine hydrochloride and 25% by weight of ammonium chloride. This dry mixture was dissolved in water to form a 20% by weight solution.

A dry mixture was prepared containing 70% by weight of methylhydrazine hydrochloride and 30% by weight of ammonium chloride. This mixture was dissolved in water to form a 10% by weight solution.

A dry mixture was prepared containing 80% by weight of hydrazine monohydrochloride and 20% by weight of ethylenediamine hydrochloride. This mixture was dissolved in water to form a 10% by weight solution.

A dry mixture was prepared containing 80% by weight of hydrazine monohydrobromide and 20% by weight of ethylenediamine hydrochloride. This mixture was dissolved in water to form a 10% by weight solution.

A dry mixture was prepared composed of 80% by weight of hydrazine dihydrochloride and 20% by weight of morpholine hydrochloride. This mixture was dissolved in water to form a 10% by weight solution.

A dry mixture was prepared composed of 80% by weight of hydrazine dihydrochloride and 20% by weight of aniline hydrochloride. This mixture was dissolved in water to form a 10% by weight solution.

A dry mixture was prepared composed of 80% by weight of hydrazine dihydrochloride and 20% by weight of orthotoluidine hydrochloride. This mixture was dissolved in water to form a 10% by weight solution.

A dry mixture was prepared composed of 80% by weight of hydrazine monohydrochloride and 20% by weight of tetramethyl ammonium chloride. This mixture was dissolved in water to form a 10% by weight solution.

A dry mixture was prepared composed of 50% by weight of hydrazine monohydrobromide and 50% by weight of hydroxylamine hydrochloride. This mixture was dissolved in water to form a 10% by weight solution.

Various modifications can be made in the teachings of the specific examples to provide other compositions which fall within the broad scope of the present invention. Thus, in place of the particular salts of hydrazine used there can be substituted one or more corresponding salts of organic derivatives of hydrazine, which derivatives fall within the general formula

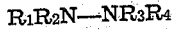

$R_1R_2N-NR_3R_4$ wherein $R_1$ is an alkyl, aralkyl or aryl hydrocarbon radical and $R_2$, $R_3$ and $R_4$ are hydrogen atoms or alkyl, aralkyl or aryl hydrocarbon radicals. Among the hydrocarbon substituents which can suitably be present in the compound of the formula $R_1R_2N-NR_3R_4$ are the methyl, ethyl, normal propyl, isopropyl, normal butyl, isobutyl, secondary butyl, benzyl, phenylethyl, phenyl, orthotolyl, metatolyl, paratolyl and the xylyl radicals. Thus, in place of the particular hydrazine salts used according to the specific examples there can be substituted the corresponding salts of symmetrical dimethyl hydrazine, unsymmetrical dimethyl hydrazine, trimethyl hydrazine, tetramethyl hydrazine, N-methyl-N' phenyl hydrazine, N,N'-diphenyl hydrazine, benzyl hydrazine, etc.

Also, in place of the particular hydrazine salts used, there can be substituted one or more other salts thereof, such as hydrazine dihydrofluoride, hydrazine dihydroiodide, trihydrazine dihydroiodide, hydrazine phosphate ($NH_2-NH_2 \cdot H_3PO_4$), hydrazine hypophosphate ($NH_2-NH_2 \cdot H_4P_2O_6$), hydrazine formate ($NH_2-NH_2 \cdot 2HCOOH$), hydrazine acetate ($NH_2-NH_2 \cdot 2CH_3COOH$), hydrazine oxalate ($NH_2-NH_2 \cdot H_2C_2O_4$), and hydrazine abietate ($NH_2-NH_2 \cdot 2C_{20}H_{30}O_2$).

Further, in addition to the particular salts of semicarbazide disclosed in the specific examples there can be substituted other semicarbazide salts, such as semicarbazide hydrofluoride and semicarbazide phosphate

$(NH_2NHCONH_2 \cdot H_3PO_4)$

In addition, in place of the ammonium and amine salts disclosed in the examples, there can be used the corresponding salts of one or more other amines, such as cyclohexylamine, piperidine and other amines falling within the scope of the formula $R_5R_6R_7N$ wherein $R_5$ is an alkyl, aralkyl or aryl hydrocarbon radical and wherein $R_6$ and $R_7$ are a hydrogen atom or an alkyl, aralkyl or aryl hydrocarbon radical. Thus, among the suitable substituents which can be included in the compound of the formula $R_5R_6R_7N$ are the methyl, ethyl, normal propyl, isopropyl, normal butyl, isobutyl, benzyl, phenylethyl, phenyl, orthotolyl, metatolyl, paratolyl and the xylyl radicals.

For example, among the suitable amines which can be used in the form of their salts are methylamine, dimethylamine, trimethylamine, methylethylamine, triethylamine, monoisopropylamine, diisopropylamine, benzylamine, aniline, orthotoluidine, metatoluidine, the xylidines, methyl phenylamine, dimethyl phenylamine, etc.

Further, in place of the tetramethyl ammonium chloride used there can be substituted one or more other tetra-alkyl ammonium halides wherein each alkyl radical contains from one to two carbon atoms, for example, tetraethyl ammonium bromide. The use of other ammonium salts is also included within the scope of this invention, for example, ammonium carbonate, ammonium formate, and ammonium phosphate, as is the use of aliphatic carboxylic acid amides containing from one to four carbon atoms, for example, formamide and propionamide.

As the specific illustrations above teach, it is convenient to dissolve the anhydrous fluxes of our invention in a suitable solvent in which the flux as solute constitutes 0.5% to 20% by weight of the total resulting solution. However, the only upper limit of this concentration is the solubility of the anhydrous material in the solvent. In some applications it is desirable for a soldering flux to be supplied in a paste form, and this is usually accomplished by intimately mixing the fluxing agent in a plastifier, such as petroleum jelly, rosin, and various other compounds. It is possible to make additions of the fluxes of our invention to such compositions, and suitable percentages are those within the range from 0.5% to 10% of the total composition by weight.

As an explanation of the wide variances in the percentages listed in the examples, it is necessary to consider the particular metals being soldered, their surface condition, and the function that the joint will perform in service. The nature of certain soldering operations and joints to be soldered is such that fluxes with slightly different melting and/or decomposition characteristics are essential to efficient soldering. In general, the compositions of the present invention will contain from about 20 to about 98% by weight of the salt or salts of hydrazine or hydrazine derivatives, based upon the weight of such salt or salts and the ammonium salt, the amine salt, the tetra-alkyl ammonium halide and aliphatic carboxylic acid amide.

Although the flux compositions embodying our invention are suitable for use in soldering most of the commonly used metals, such as copper, brass, bronze, aluminum, zinc, tin or galvanized surfaces, and iron and steel and their alloys, it has been found that by taking into consideration the properties and condition of the metals to be soldered, more effective results may be obtained with certain of the flux compositions herein disclosed than with others.

The composition of the present invention, when employed as a flux in soft soldering, is used in the same manner as the fluxes which have been heretofore proposed. In using the flux, a flux, solder, basis-metals system is formed which is heated to activate the flux, fuse the solder and make the joint. After the work has been cooled, it will be found that if any residue has been left as a result of soldering, it is noncorrosive.

Wetting agents have been heretofore incorporated into flux compositions, and, if desired, such agents can also be incorporated in the flux of the present invention.

The use of one or more salts of ammonia or of an amine or the tetra-alkyl ammonium halide or the lower aliphatic carboxylic acid amide results in a decrease in the rate at which gas is evolved from the mixture with respect to increase in temperature. Since the evolution of gas from the mixture is a manifestation of decomposition, it is possible to increase the temperature at which final decomposition will take place. As a result of increasing the range of temperature over which the flux composition is active, it is possible to increase the area over which the molten solder will spread, thereby obtaining improved soldering.

This application is a continuation in part of our prior copending application, Serial No. 113,672, filed September 1, 1949, now abandoned, for "Soldering Flux."

We claim:

1. A composition of matter suitable for use as a soldering flux comprising essentially, as a first component, at least one salt of a compound of the class consisting of semicarbazide and $R_1R_2N-NR_3R_4$ in which $R_1$, $R_2$, $R_3$ and $R_4$ are substituents selected from the group consisting of the hydrogen atom and alkyl, aralkyl and aryl hydrocarbon radicals and, as a second component, at least one compound selected from the group consisting of cyclohexylamine salts, hydroxylamine salts, morpholine salts, ethylenediamine salts, piperidine salts, salts of $R_5R_6R_7N$ in which $R_5$, $R_6$ and $R_7$ are substituents selected from the group consisting of the hydrogen atom and alkyl, aralkyl and aryl hydrocarbon radicals, and $R_8R_9R_{10}R_{11}NX$ in which $R_8$, $R_9$, $R_{10}$ and $R_{11}$ are substituents selected from the group consisting of the methyl and ethyl radicals and in which X is a halogen atom, the weight of said second component being within the range from 2 to 80%, based upon the weight of said two components.

2. A composition as in claim 1 in which said first component is at least one salt of hydrazine.

3. A composition as in claim 1 in which said second component is at least one salt of ammonia.

4. A composition as in claim 1 in which said first component is at least one salt of hydrazine and in which said second component is at least one salt of ammonia.

5. A composition as in claim 1 in which said first component is at least one hydrazine hydrohalide and in which said second component is at least one ammonium halide.

6. A composition as in claim 1 in which said first component is a mixture of hydrazine monohydrobromide and hydrazine dihydrobromide and in which said second component is ammonium bromide.

7. A composition as in claim 1 in which said first component is a mixture of hydrazine monohydrobromide and hydrazine dihydrobromide and in which said second component is a mixture of ammonium chloride and ammonium bromide.

8. A composition as in claim 1 in which said first component is hydrazine monohydrobromide and in which said second component is ammonium bromide.

9. A composition as in claim 1 in which said first component is hydrazine monohydrobromide and in which said second component is ammonium chloride.

10. A composition as in claim 1 in which said first component is hydrazine monohydrobromide and in which said second component is a mixture of ammonium chloride and ammonium bromide.

11. In soft soldering, the step of applying to the metals to be joined the composition defined by claim 1.

12. In soft soldering, the step of applying to the metals to be joined the composition defined by claim 2.

13. In soft soldering, the step of applying to the metals to be joined the composition defined by claim 3.

14. In soft soldering, the step of applying to the metals to be joined the composition defined by claim 4.

15. In soft soldering, the step of applying to the metals to be joined the composition defined by claim 5.

HOBART H. WILLARD.
WILLIAM S. GALE.

REFERENCES CITED

The following references are of record in the file of this patent:

UNITED STATES PATENTS

| Number | Name | Date |
|---|---|---|
| 1,882,734 | Barber | Oct. 18, 1932 |
| 2,089,095 | Magill | Aug. 3, 1937 |
| 2,155,307 | Hagemann | Apr. 18, 1939 |

FOREIGN PATENTS

| Number | Country | Date |
|---|---|---|
| 677,994 | Germany | July 6, 1939 |
| 751,370 | France | June 19, 1933 |

OTHER REFERENCES

Mellor, "Comprehensive Treatise on Inorganic and Theoretical Chemistry," vol. VIII, page 328, published 1928, by Longmans, Green and Co., New York.